United States Patent Office 3,151,045
Patented Sept. 29, 1964

3,151,045
PROCESS FOR THE REMOVAL OF AROMATIC IMPURITIES FROM PHENYL METHYL POLYSILOXANES
Karl Wrabetz and Walter Simmler, Cologne-Mulheim, Germany, assignors to Farbenfabriken Bayer Aktiengesellschaft, Leverkusen, Germany, a corporation of Germany
No Drawing. Filed Mar. 2, 1961, Ser. No. 92,774
Claims priority, application Germany Mar. 31, 1960
6 Claims. (Cl. 202—42)

In the synthesis of phenyl chlorosilanes from silicon and chlorobenzene, aromatic side-products result in small quantities, such as diphenyl and its chlorine derivatives which in the subsequent hydrolysis and condensation to phenyl-substituted polysiloxanes, for example phenyl methyl polysiloxanes, are taken up by the latter, so that they impart an undesirable odor to them.

In order to remove such impurities from low polymeric siloxanes whose boiling points are close to those of the aforesaid impurities, one can according to a proposal not in the prior art, use an extraction process with the aid of polyvalent alcohols, amino alcohols or amines. Such a process has indeed the advantage of being applicable even to heat sensitive siloxanes at lower temperatures but the extraction agents for their part are not odorless and require therefore an especial expenditure both for their removal and for their recovery for the purpose of further use.

It has now been found that an essentially simpler purification of phenyl methyl polysiloxanes, whose boiling range lies in that of the aromatic impurities, can be carried out by subjecting these siloxanes in admixture with a divalent alcohol or ether alcohol to a distillation, until the added diol is again completely driven off whereby the aforesaid impurities for the most part evaporate, the bulk of the siloxanes, however, surprisingly remaining behind.

The following example is given for the purpose of illustrating the invention.

Example 1 kg. of a polymeric homologous mixture of low polymeric phenyl methyl siloxanes whose viscosity at 20° C. is 20 centistokes and in which the phenyl methyl ratio is 1:5, is mixed with 1 kg. of diethylene glycol and distilled at a pressure of 16 mm. mercury and temperatures up to 135° C. until the quantity of diethylene glycol used has gone over in the distillate.

The residue is washed twice with half its volume of saturated common salt solution and filtered through a layer of mixed anhydrous calcium chloride and activated carbon. The filtrate is colorless and odorless and contains less than 0.5% by weight of chlorine in the form of aromatic chlorinated hydrocarbons as against 4% by weight in the original crude siloxane.

The distillate separates into two layers, the lower containing the diethylene glycol and a part of the aromatic chlorinated hydrocarbons; the remaining parts form the upper layer together with about 30% of the phenyl methyl polysiloxane used for distillation. The latter layer is introduced again with fresh crude product into the purification process. The lower layer is stirred with a quarter of its volume of water, whereupon it again forms two layers, the lower layer of which consists of the aromatics and is rejected. The diethylene glycol floating upon it is freed by distillation from the water mixed therewith and again used in further processing.

If instead of the diethylene glycol one uses propylene glycol and proceeds otherwise in an analogous manner, a well purified product is likewise obtained but in the distillation larger proportions of phenyl methyl polysiloxanes go over. By using ethylene glycol in place of the diethylene glycol this is indeed not the case but more impurities remain in the distillation residue.

We claim:

1. Process for the removal of silicon-free aromatic impurities from penyl methyl polysiloxanes prepared from phenylchlorosilane in turn synthesized from silicon and chlorobenzene, which comprises mixing the impure phenyl methyl polysiloxanes with a diol selected from the group consisting of ethylene glycol, diethylene glycol, and propylene glycol, and separating said diol together with the impurities from the polysiloxanes by distillation.

2. Process for the removal of biphenyl and chlorinated biphenyl as aromatic impurities from phenyl methyl polysiloxanes which comprises mixing the impure phenyl methyl polysiloxanes with diethylene glycol and separating the diethylene glycol together with said aromatic impurities from the polysiloxanes by distillation at about 135° C. until substantially all of the diethylene glycol is distilled off.

3. Process according to claim 2 wherein the residue obtained in the distillation is washed with saturated common salt solution and filtered through a layer of mixed anhydrous calcium chloride and activated carbon, to recover the polysiloxanes in substantially pure form.

4. Process according to claim 3 wherein the distillate obtained in the distillation is recovered in the form of two separate layers including a lower layer containing diethylene glycol and said aromatic impurities as well as an upper layer containing diethylene glycol and phenyl methyl siloxanes, said upper layer being separated from said lower layer and recycled to the mixing step of the process.

5. Process according to claim 4 wherein said lower layer is stirred with water to form an aqueous upper layer of diethylene glycol and water as well as an organic lower layer of said aromatic impurities, said aqueous upper layer being recovered and distilled to separate the diethylene glycol from the water for recycling in the process.

6. Process for the removal of silicon-free aromatic contaminants from liquid phenyl methyl polysiloxanes, which comprises mixing the contaminated phenyl methyl polysiloxanes with a diol selected from the group consisting of ethylene glycol, diethylene glycol, and propylene glycol, and subjecting the two-phase mixture thus obtained to distillation until all of the said diol is driven off, thereby evaporating substantially the said aromatic contaminants with the diol from the remaining phenyl methyl polysiloxanes.

References Cited in the file of this patent
UNITED STATES PATENTS

| | | |
|---|---|---|
| 2,380,995 | Rochow | Aug. 7, 1945 |
| 2,456,561 | Lake et al. | Dec. 14, 1948 |
| 2,467,198 | Greene | Apr. 12, 1949 |
| 2,717,233 | Trotter | Sept. 6, 1955 |
| 2,852,484 | New | Sept. 16, 1958 |
| 2,903,473 | Takami et al. | Sept. 8, 1959 |

OTHER REFERENCES

Lewis: "Jour. Am. Chem. Soc.," vol. 70, (1948), pages 1115–7.

Techniques of Organic Chemistry, vol. IV, Distillation Interscience Publication, Inc., New York, 1951, pages 356–368 relied upon.

Azeotropic Data, Horsley, American Chemical Soc., June 1952, Washington, D.C., pages 68, 103, and 132 relied upon.